US007787656B2

(12) United States Patent
Chen

(10) Patent No.: US 7,787,656 B2
(45) Date of Patent: Aug. 31, 2010

(54) METHOD FOR COUNTING PEOPLE PASSING THROUGH A GATE

(75) Inventor: Chao-Ho Chen, Tai-Nan (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 852 days.

(21) Appl. No.: 11/681,148

(22) Filed: Mar. 1, 2007

(65) Prior Publication Data
US 2008/0212099 A1 Sep. 4, 2008

(51) Int. Cl.
*G06K 9/00* (2006.01)
*G06K 9/48* (2006.01)
*G01N 21/25* (2006.01)
(52) U.S. Cl. ............... 382/103; 382/133; 382/154; 382/181; 382/199; 356/408
(58) Field of Classification Search .................. None
See application file for complete search history.

(56) References Cited

U.S. PATENT DOCUMENTS

| | | | | |
|---|---|---|---|---|
| 4,827,264 | A * | 5/1989 | Bjelk | 342/61 |
| 2004/0017929 | A1 * | 1/2004 | Bramblet et al. | 382/103 |
| 2007/0098253 | A1 * | 5/2007 | Crespi et al. | 382/159 |
| 2008/0285802 | A1 * | 11/2008 | Bramblet et al. | 382/103 |

OTHER PUBLICATIONS

Thou-Ho (Chao-Ho) Chen, Tsong-Yi Chen and Zhi-Xian Chen, "An Intelligent People-Flow Counting Method for Passing Through a Gate", 2006 IEEE International Conference on Cybernetics&Intelligent Systems (CIS), Bangkok, Thailand, Jun. 7-9, 2006. (pp. 573-578).*

* cited by examiner

*Primary Examiner*—Andrew W Johns
*Assistant Examiner*—Tahmina Ansari
(74) *Attorney, Agent, or Firm*—Winston Hsu

(57) ABSTRACT

Based on area and color analyses, a cost-effective bi-directional people counter dedicated to the pedestrian flow passing through a gate or a door is proposed. Firstly, the passing people are roughly counted with the area of people projected on an image captured by a zenithal video camera. The moving direction of the pedestrian can be recognized by tracking each people-pattern with an analysis of its HSI histogram. To improve the accuracy of counting, the color vector extracted from the quantized histograms of intensity or hue is introduced to refine the early counting. Besides, the inherent problems of both people touching together and merge/split phenomenon can be overcome.

1 Claim, 14 Drawing Sheets

(a)

(b)

METHOD FOR COUNTING PEOPLE PASSING THROUGH A GATE

BACKGROUND OF THE INVENTION

1. Field of the Invention

The present invention relates to a method for counting people passing through a gate, and more particularly, to a method for counting people passing through a gate by analyzing the area of the people, the colors of clothing the people wear, and the moving patterns of the people.

2. Description of the Prior Art

An accurate automatic counting of pedestrian flow through a gate is very attractive for the entry control and access surveillance of important military, building security and commercial applications. Without losing the generality, the early automatic counting approaches, such as turn stiles, rotary bars, and light beams, had suffered one intractable problem: they could not count the passing people accurately unless there is only one pedestrian passing through the gate at one time. To solve this problem, many image-processing based approaches with various applications are hence motivated and all provide a real-time automatic counting for people passing through a specific region of interest by analyzing a series of images captured with a video camera.

For the transportation applications, Bartolini et al. and Albiol et al. addressed the problems of determining the number of people getting into and out of a bus and train, respectively. To avoid the occlusion problem, Rossi and Bozzoli and Sexton et al. mounted the camera vertically with respect to the floor plane and set the optical axis of the camera in such a way that the passing people could be observed from just overhead.

The system based on template motion-estimation tracking may be very time-consuming because the computation complexity increases substantially with the increasing number of pedestrians and may suffer from people-touching overlapping. Focused on dynamic backgrounds, Zhang and Sexton developed an automatic pedestrian counting method on an escalator or a moving walkway by using a model-specified directional filter to detect object candidate locations followed by a novel matching process to identify the pedestrian head positions in an image even with complicated contents. With the gray-level-based head analysis, the method will suffer from the following situations: a low contrast of the head image with the background and hairstyles or pedestrians wearing various hats. The first case illustrates that the gray-level technique cannot provide sufficient information for extracting the required pattern from an image, and the second case reveals that various sizes and shapes of the human body due to clothing may affect model-based processing.

To increase the count of people passing through a gate at one time, Terada et al. used the stereo images captured by a pair of cameras to cope with both problems of the crowd counting and direction recognition of the passing people. The setting of the stereo camera is complicated and the measurement will be seriously sensitive to any shift of camera. To avoid limiting the setting position of the camera and counting several times for a single person as they move around, multiple cameras located over the region of interest will be the allowable solution. Based on the cost-effective consideration, a single camera with a tracking algorithm may be the better solution and thus Masoud and Papanikolopoulos developed a rectangular model-based recognition of the pedestrian with a human motion analysis to achieve a reliable people count. By setting a fixed single camera hung from the ceiling of the gate, Kim et al. proposed a real-time scheme to detect and track the people moving in various directions with a bounding box enclosing each person. Also using a single zenithal camera, Bescos et al. introduced a DCT based segmentation, which can efficiently consider both lighting and texture information to cope with some problems, such as shadows, sudden changes in background illumination and sporadic camera motion due to vibration, in order to count people crossing an entrance to a big store.

On the other hand, by taking advantage of human motion analysis, many techniques of the human body tracking or pedestrian detection may be applied to the pedestrian counting in open spaces, in which the camera is usually set with a downward-sloped view to obtain a more sufficient surveillance range. Nevertheless, the tracking process is always very computational-intensive and such a camera setting will result in being intractable to segmenting or recognizing each person in a crowd of pedestrians owing to the overlapping problem.

Some of the above people-counting methods can solve the problem of real-time counting for the crowded pedestrians. However, those methods have not dealt with another frequently-happening overlapping problem, called "people-touching overlapping", which is resulted from the situation when bodies of pedestrians touch each other, e.g. walking close together, walking hand in hand and putting one's hand on another's shoulder or waist, in spite of using a zenithal camera. Also, they have not mentioned how to deal with the merge-split case that people walk sometimes touching with one another and sometimes separating from others. To overcome the above problems, an area and color information based approach is proposed but some problems of tracking needs to be improved for increasing the counting accuracy, especially when the pedestrian walks fast.

SUMMARY OF THE INVENTION

The present invention provides a method for counting people passing through a gateway, the method comprising: capturing substantially vertically downward images of the gateway; adding a first moving object to an object list when the first moving object crosses a first baseline according to a first image of the captured images; adding a second moving object to the object list when a image of the captured images subsequent to the first image indicates that the second moving object split from another moving object already in the object list; deleting a third moving object from the object list when a image of the captured images subsequent to the first image indicates that the third moving object merged with another moving object already in the object list; comparing each of the moving objects in the object list to predetermined area models for an estimated people count corresponding to each of the moving objects; applying a corresponding bounding box onto each of the moving objects in the object list; calculating color data of each of the moving objects in the object list for generating a corresponding color vector according to a predetermined algorithm; tracking each of the moving objects in the object list according to the corresponding color vector and the corresponding bounding box; and utilizing the corresponding estimated people count to count the people passing through the gateway when the corresponding moving object is tracked as crossing a second base line.

Some concepts of the present invention have already been published in the proceedings of conference, as described below: Thou-Ho (Chao-Ho) Chen, Tsong-Yi Chen and Zhi-Xian Chen, "An Intelligent People-Flow Counting Method for Passing Through a Gate", 2006 IEEE International Conference on Cybernetics&Intelligent Systems (CIS), Bangkok, Thailand, Jun. 7-9, 2006. (pp. 573-578)

These and other objectives of the present invention will no doubt become obvious to those of ordinary skill in the art after reading the following detailed description of the preferred embodiment that is illustrated in the various figures and drawings.

DETAILED DESCRIPTION

Figure 1:
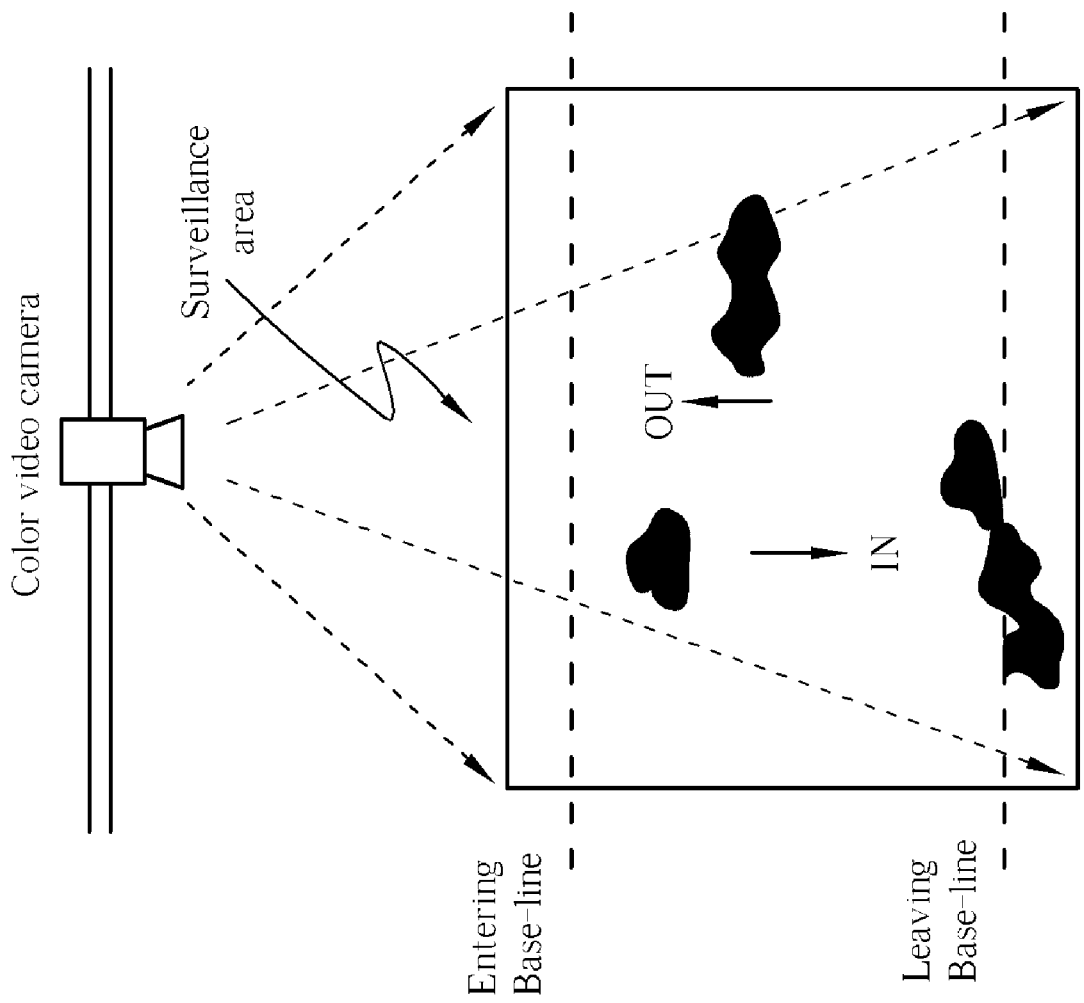
FIG. 1 is a diagram illustrating the setting of the present invention.

The present invention solves the problem of determining the number of pedestrians passing bi-directionally through a gate (or door). Based on analyses of area and color information in a segmented people-image, the inherent people-touching overlapping problem can be overcome. By a two-stage counting strategy, the area of pedestrian images segmented from the background is firstly used to count the passing people and then color information is utilized for refining the initial count. In the proposed scheme, one color video camera is set on the ceiling of the gate with a directly downward view so that the passing people will be observed from just overhead. By using frame differencing and segmenting techniques, the isolated people-image pattern, in which each people-pattern may be composed of one or more persons, as shown in FIG. 1, can be obtained. The people number of a segmented pattern may be changeable during the passing process because of the merge-split problem that will confuse the counting. The merge-split problem can be solved by tracking each people pattern through analyzing the HSI (hue/saturation/intensity) histogram in order to refine the early count.

1. SYSTEM SETTING

Basically, the camera is set with a downward-sloped viewing and hence it can bear a sufficient range of monitoring. But this setting frequently makes the people-images be overlapped with each other on a captured image. Fortunately, setting the camera on the ceiling with a direct downward view can solve the problem. Anyway, the inherent people-touching overlapping problem will be incurred owing to people walking close together and the people's intimate gestures, such as hand in hand, putting one's hand on another's shoulder or waist, and other familiar actions. No matter how the camera is set, such an overlapping problem due to people touching cannot be avoided.

To reduce overlapping of the captured pedestrian images, a color video camera is set on the ceiling with a view of facing vertically downward above the passersby, as shown in FIG. 1. Two base-lines within the surveillance area are virtually defined for direction orienting of entering or leaving the gate. The counting process will be started and ended when one people-image moves across the entering base-line and leaving base-line, respectively. Then, the in-counting and out-counting will be verified when the people have crossed over the leaving base-line and entering base-line, respectively. In such a counting system, we suppose that the pedestrian is moving relative to a static background.

2. AREA-BASED PEOPLE COUNTING

An area-based strategy used in a people counting process has been reported in many previous researches. In the proposed counting scheme, the area of people-image pattern is considered to be able to provide a good first estimation of how many people being contained in that pattern. Further, it can support information for tracking and discriminating between multi-person and single-person patterns when encountering a merge-split case.

Figure 4:
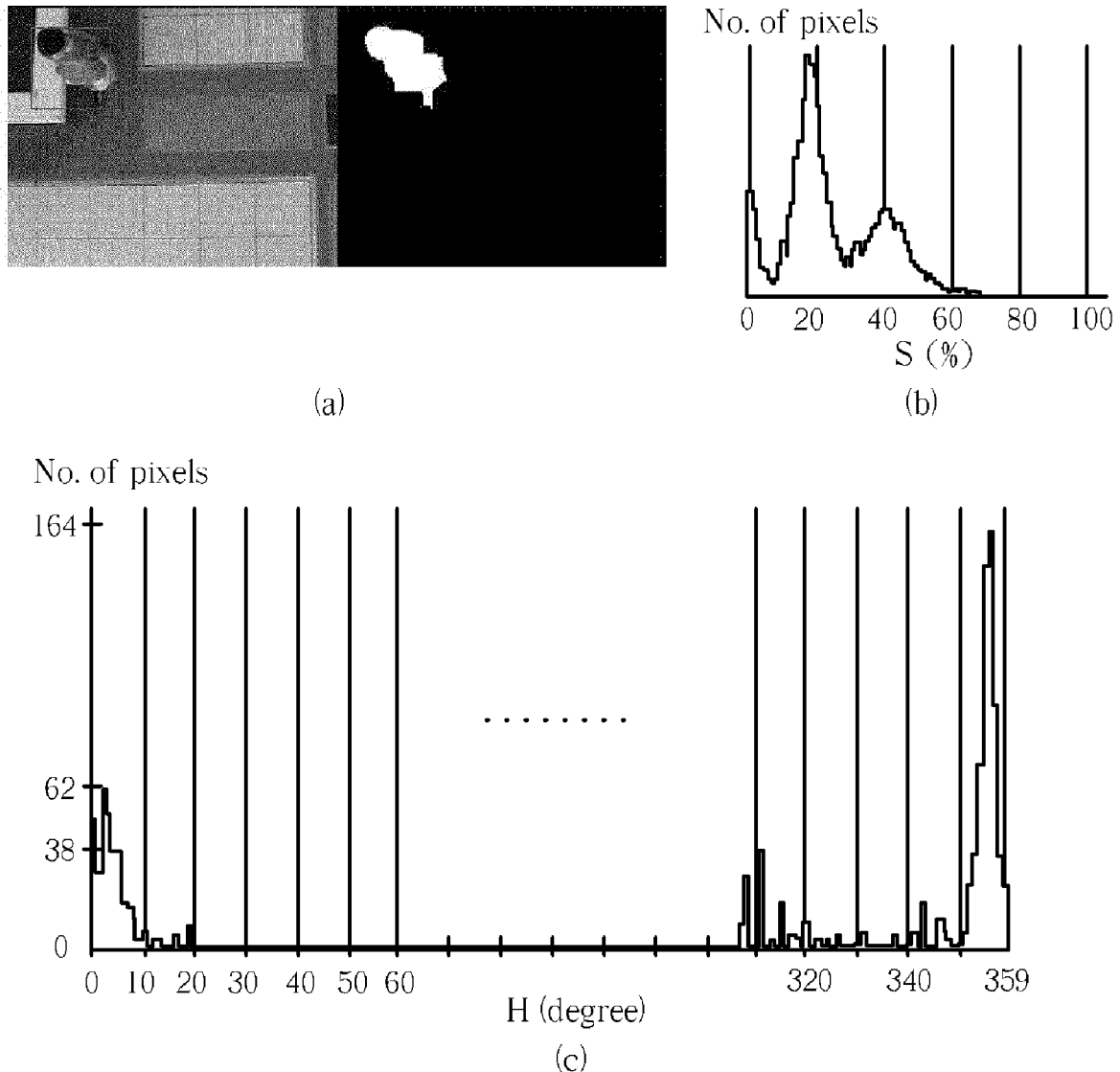
FIG. 4 is a diagram illustrating the analysis of a single-pedestrian image of the present invention.
Figure 5:
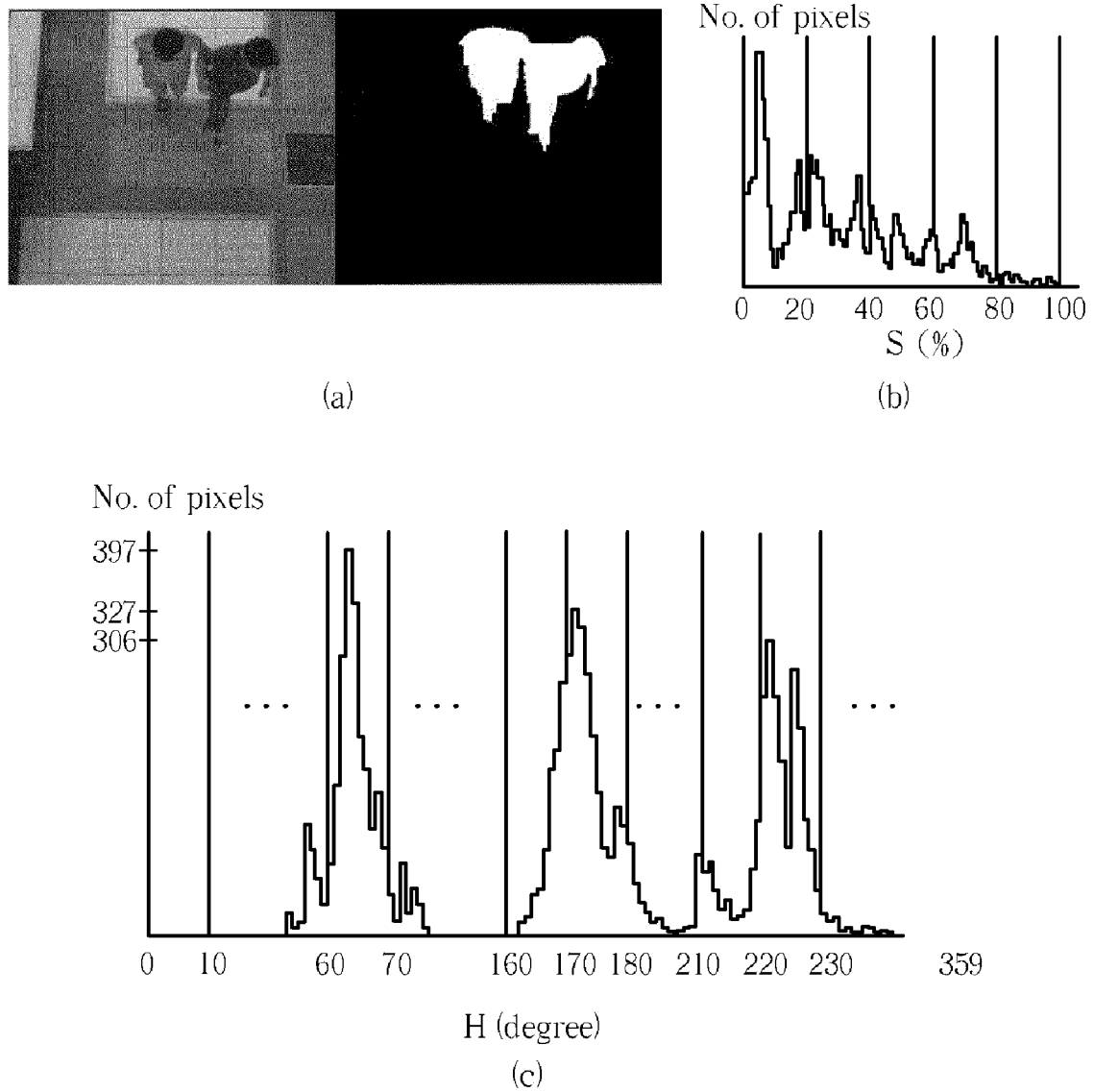
FIG. 5 is a diagram illustrating the analysis of a two-pedestrian image of the present invention.

At first, the typical area size of a single-person image is defined as NP pixels per person, where the typical value means a minimal. Owing to clothing or accessories, a threshold value of allowable maximal quantity of pixels for a single-person image is given as 1.4 times of NP. Practically, the area of n-person image will be smaller than total area of n single-person images due to the overlapping resulted from the people-touching situation mentioned previously. From the statistical data of experiments, the decision rule of how many people being existed in a multi-person image can be deduced as follows:

$$PN_{PI}=1, \text{ if } N_P \leq N_{PI} < 1.4N_P \tag{1}$$

$$PN_{PI}=2, \text{ if } 1.4N_P \leq N_{PI} < 2.6N_P \tag{2}$$

$$PN_{PI}=3, \text{ if } 2.6N_P \leq N_{PI} < 3.6N_P \tag{3}$$

$$PN_{PI}=4, \text{ if } 3.6N_P \leq N_{PI} < 4.8N_P \tag{4}$$

$$PN_{PI}=5, \text{ if } 4.8N_P \leq N_{PI} < 5.8N_P \tag{5}$$

where PNPI and NPI denote the people number and pixel number for a people-image, respectively. However, the above rules are based on the evaluation of the oriental human and light clothing effective when people walk in a normal way. If the people number in a people-image is more than five, it is not sure that a reliable decision rule can be derived. Though, it is very seldom seen that six or more people walk together in touch with one another, so, the above five conditions are sufficient for most of the general situations of walking together. FIG. 4(*a*), FIG. 5(*a*) and FIG. 6(*a*) show the images of a single-person (walking alone), two single-persons (walking in the opposite direction each other) and two-person (walking hand in hand), respectively, and their segmented patterns. The segmented single-pedestrian pattern in FIG. 4(*a*) has 2204 pixels, the two-pedestrian pattern in FIG. 5(*a*)

has 4856 pixels and two single-pedestrian patterns in FIG. 6(a) have 1942 pixels for the left pattern and 2449 pixels for the right pattern.

3. ANALYSIS OF HSI HISTOGRAM

To simulate the color sensing properties of the human visual system, RGB color information is usually transformed into a mathematical space that decouples the brightness (or luminance) information from the color information. Among various such color models, HSI color model is very suitable for providing a more people-oriented way of describing the colors, because the hue component is intimately related to the way in which human beings perceive color. The intensity (I) is the brightness of the color and the hue (H) represents a dominated (or pure) color as perceived by an observer. The saturation (S) is a measure of how much white is in the hue. For converting colors from RGB to HSI, given an image in RGB color format, the H, S and I components of each RGB pixel can be deduced by the following equations:

$$I = \frac{1}{3}(R+G+B), 0 \leq M \leq 1 \quad (6)$$

$$S = 1 - \frac{3}{(R+G+B)}[\min(R,G,B)], 0 \leq S \leq 1 \quad (7)$$

$$H = \begin{cases} \theta, & \text{if } B \leq G \\ 360 - \theta, & \text{if } B > G \end{cases} \quad (8)$$

$$\theta = \cos^{-1}\left\{\frac{\frac{1}{2}[(R-G)+(R+B)]}{\left[(R-G)^2+(R-B)(G-B)^{\frac{1}{2}}\right]}\right\}, 0° \leq H \leq 360°$$

It is assumed that the above RGB values have been normalized into the range [0, 1]. In point of distinguishing each pedestrian, hue will be a good discriminative feature indicating color information of the pedestrian's clothing or accessories. When three components, R, G and B, of a pedestrian's image captured by a color camera are about equal to each other, it implies that the saturation will approach to zero and thus it becomes meaningless to define the value of hue. In such a situation, the intensity will be introduced to replace the role of hue.

Loosely speaking, a histogram can give an estimate of the appearance probability of someone's pixel-value in an image. Thus, the histogram of hue or intensity can be used to discriminate one pedestrian from another. To make a tradeoff between the matching complexity and discriminative information, the hue histogram is quantized into many slices. At first, suppose that the range of hue, i.e., from 0° to 360° is divided by a slicing factor k into (360/k) slices, where a slice means a k-degree interval of hue. The level of each slice is defined as the hue value, which has a maximal pixel-number within that interval (i.e., slice). For numerical representation, let $HS_i$ represent the hue level of the i-th slice where i=1, 2, . . . , 360/k. To reduce the matching complexity and enhance the discrimination, a moderate quantity of larger-level hue slices are extracted for forming a distinguishing vector, also called "color vector", denoted by CV. Therefore, for person identification, an n-dimensional color vector composed of n larger hue levels (i.e., $HS_i$) is used to label each pedestrian. Such a hue-based color vector is formed as $$CV_H = \max_n\left\{HS_i, i=1,2,\ldots,\frac{360}{k}\right\} \quad (9)$$
$$= (HS_{max-1}, HS_{max-2}, \ldots, HS_{max-n})$$

where the operation of $\max_n\{\}$ is defined to select n significant values of $HS_i$, denoted by $HS_{max-1}$, $HS_{max-2}$, . . . , $HS_{max-n}$, in order of pixel-number. Nevertheless, it should be noted that the angle definition of H (hue) will be meaningless if S (saturation) approaches to zero. In such a situation, the I (intensity) component will be introduced to form the color vector, $CV_I$. By the same deduction of $CV_H$, we can obtain $$CV_I = \max_n\left\{IS_i, i=1,2,\ldots,\frac{256}{k}\right\} \quad (10)$$
$$= (IS_{max-1}, IS_{max-2}, \ldots, IS_{max-n})$$

where the range of I (intensity) is supposed from 0 to 255, $IS_i$ denotes the level of the i-th slice of the intensity histogram and $IS_{max-1}$, $IS_{max-2}$, . . . , $IS_{max-n}$ denote n significant ones of $IS_i$ in order of pixel-number.

FIGS. 4(b) and (c) describe the saturation and hue histograms, respectively, in a single-pedestrian image. The saturation histogram of the segmented pedestrian-pattern is mainly distributed from 0% to 60%. With a slice factor k=10, the hue histogram has a maximal value of 164 at hue 356, i.e., the 36-th slice of hue, which also indicates that the pedestrian wears red-dominant clothing. In the H-histogram slices, with a color-vector dimension n=3, three numbers of pixels, 164, 62 and 38, are located at the hue value of 356, 3, and 310, respectively, and thus such three hue levels form a color vector of (356, 3, 310).

FIGS. 5(b) and (c) show that both histograms of S and H in the two-pedestrian pattern look like multi-peak and more widely distributed than those of the single-pedestrian pattern. In FIG. 5(c), with k=10 and n=3, the H histogram has three major peaks of pixel-number 397 at hue 63, pixel-number 327 at hue 171 and pixel-number 306 at hue 221, which imply that there are three major colors, yellow-like, cyan-like and blue-like, existing in the extracted pattern. Thus, a color vector of $CV_H$=(63, 171, 221) is obtained according to these three larger hue levels.

When most pixels are distributed on zero saturation or so, the I-histogram, replacing H-histogram, will be analyzed for providing the color vector, as shown in FIGS. 6(b) and (c). The right person in FIG. 6(a) has the dark-grayish clothing and hence the segmented pattern adopts the I-histogram to form a three-dimensional color vector $CV_I$=(65, 30, 210), as illustrated in FIG. 6(c), in which the slice-factor k=16 is used to divide the I-histogram into 16 slices. The left segmented pattern in FIG. 6(a) has a non-zero saturation distribution in the S-histogram, so the chromatic feature is used to form a color vector of $CV_H$=(354, 346, 304).

4. STABILITY OF COLOR VECTOR

Figure 6:
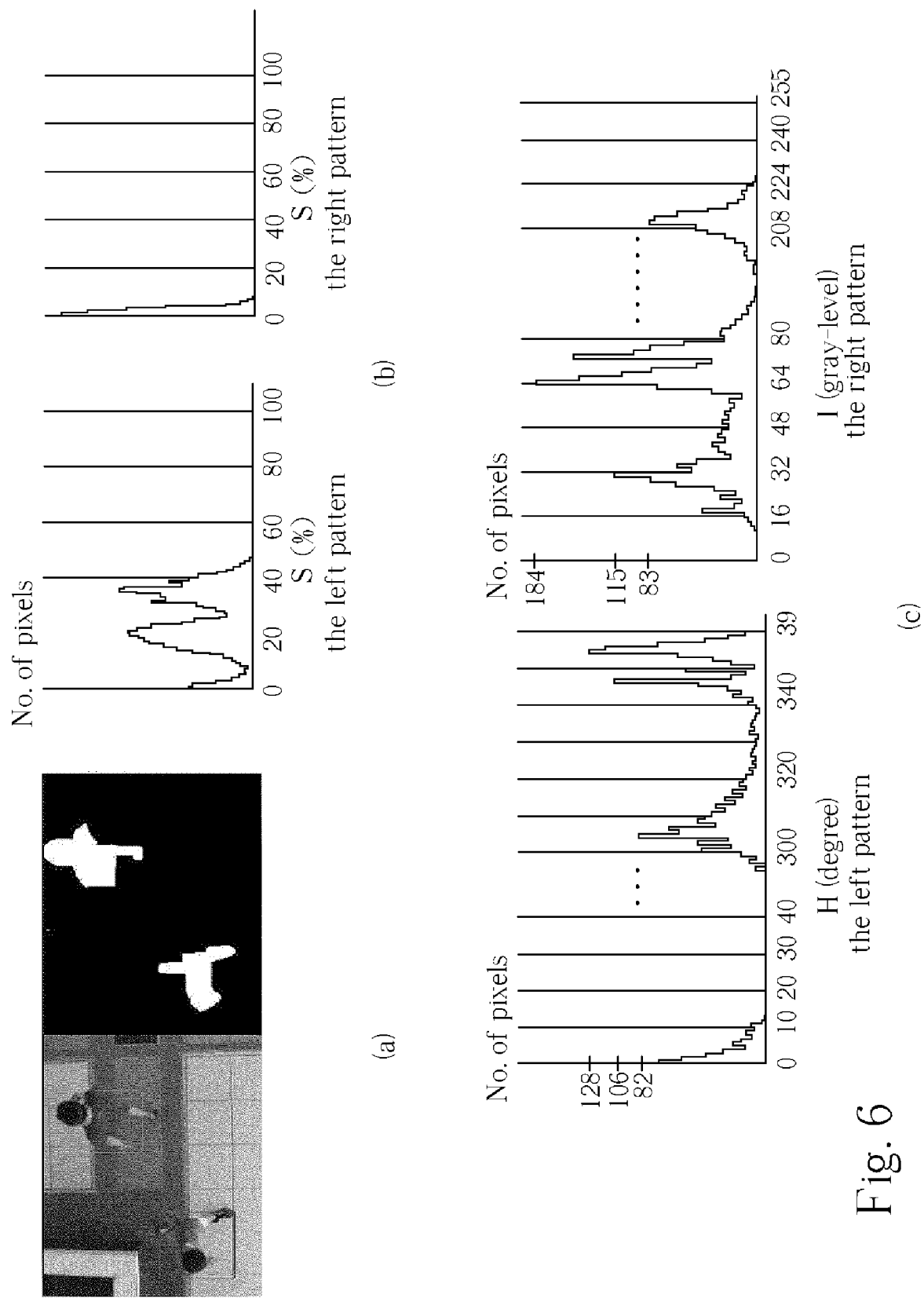
FIG. 6 is a diagram illustrating the analysis of two single pedestrians walking in the opposite direction of the present invention.

Owing to the effect of camera-capturing view and background illumination from various positions in the surveillance area, the S-histogram of the left man in FIG. 6 is slightly different in hue from that of FIG. 4 in spite of the fact that such two persons of the both figures are the identical. The most-frequently occurred situation is that those three components of color vectors of the segmented patterns at different positions for the same pedestrian are similar in hue but not the identical. Assume for the same pedestrian, $CV_1=(C_{11}, C_{12}, C_{13})$ and $CV_2=(C_{21}, C_{22}, C_{23})$ are derived at position-1 and position-2, respectively. Due to the similarity existing in both $CV_1$ and $CV_2$, the relation between these two color vectors can be described as $$CV_1 = CV_2 + \Delta C \qquad (11)$$

where the difference $\Delta C=(\Delta C_1, \Delta C_2, \Delta C_3)$ and thus $C_{11}=C_{21}+\Delta C_1$, $C_{12}=C_{22}+\Delta C_2$ and $C_{13}=C_{23}+\Delta C_3$.

Because of a moderate surveillance scope used in the proposed scheme, the effect of camera-capturing view and background illumination will be small in hue for color vectors. If the surveillance scope is enlarged, the values of color vectors may be influenced, substantially by both camera-capturing view and background illumination in various positions. For this reason, in point of matching color vectors for person identification, it is allowable to tolerate the difference $\Delta C$ during the tracking process. On the other hand, only two components of a color vector are used for matching if the pedestrian wears multicolor clothing or color-varying clothing. This means that it is permissible that any two components of a color vector are matched for person identification during the tracking process, because the multicolor or color-varying clothing may largely change the color vector, i.e., changing the hue.

In theory, a larger k can reduce the above problem of matching tolerance but it may have a risk of mismatching. Relatively, a small k can provide a more precise person-identification but it will incur a complicated identification. Therefore, a moderate k for slicing the histogram and a tolerable difference between two color vectors being matched for identifying each person are necessary. On the other hand, the number of elements included in the color vector can also affect the correctness of person identification.

Being similar to the discussion of the slicing factor k, a larger n (i.e., the dimension of the color vector) can improve the precision of person identification but it requires a larger computational burden and may hardly achieve a complete match of color vectors, i.e., all elements of the color vector are matched. Oppositely, a smaller n can reduce computations of the color-vector matching but usually yields an erroneous match. Therefore, the appropriate values of both the slicing factor k and color-vector's dimension n are very important for achieving a correct person-identification. According to statistical data of experiments, $k=10$ for the quantization of hue histogram, $k=16$ for the quantization of intensity histogram and $n=3$ for the dimension of color vector are very suitable in the proposed counting system. Besides, a moderate matching tolerance is still necessary for accelerating the matching process to provide an acceptable result.

5. PEOPLE TRACKING

Figure 7:
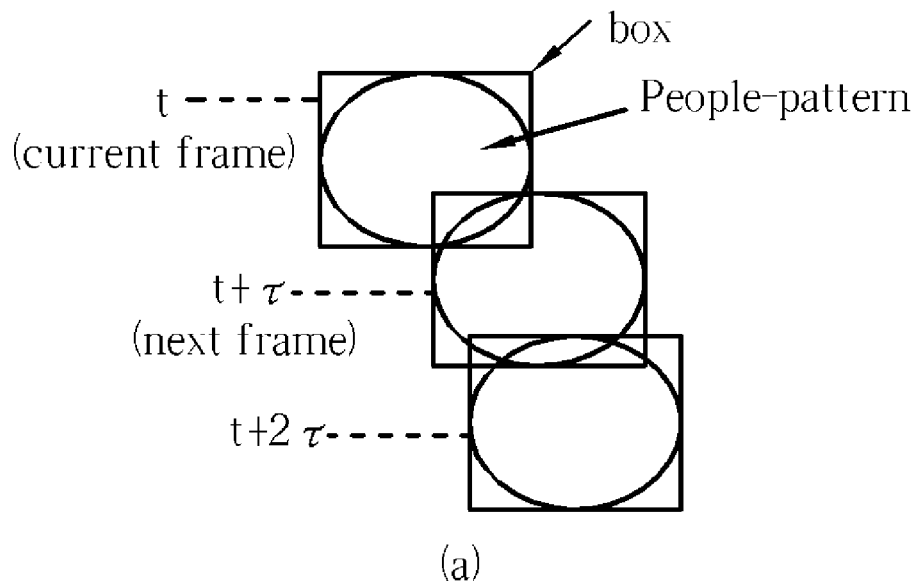
FIG. 7 is a diagram illustrating the trailing of a bounding box of the present invention.
Figure 7:
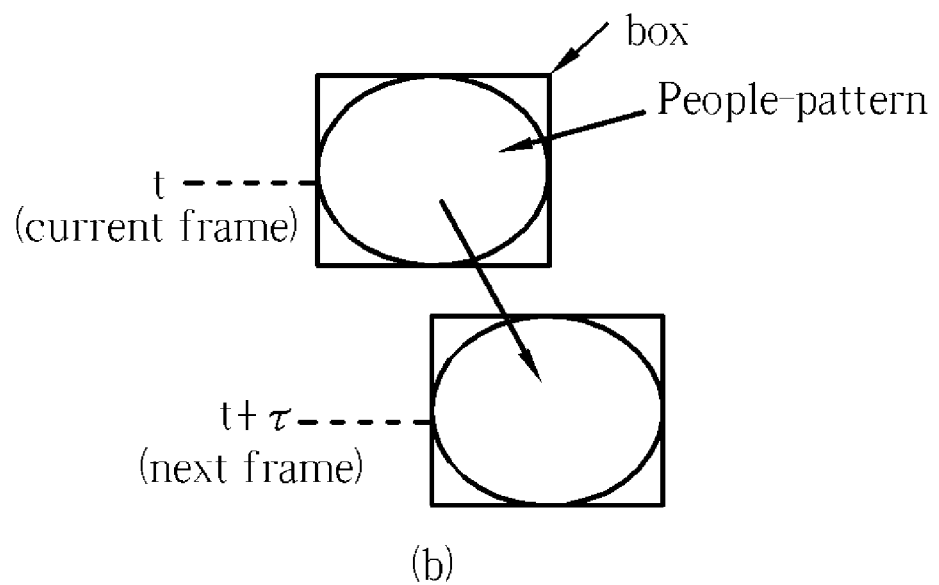

From the chromatic analysis of people's clothing discussed in the above section, each people-pattern will be labeled with a color vector for the purpose of tracking. However, the color vector will become ineffective in identification if each pedestrian's clothing has the same color, e.g. a certain type of clothing that is worn by all the members of a group or organization. Hence, a bounding-box is introduced to trail the people-pattern, as illustrated in FIG. 7, in which an intersectional case is described in the subfigure FIG. 7(a) and disjointed case in the subfigure FIG. 7(b). If any two bounding-boxes of the identical people-pattern in consecutive images captured have an intersection, such two people-patterns enclosed with a box in adjacent images (e.g. the current and next frames) will be judged that the both patterns are generated from the same person. On the contrary, the two people-patterns may not represent the identical person if their bounding-boxes have no intersection. It is noted that the value of time interval τ will be adjustable and dependent on the frame-sampling rate.

Figure 8:
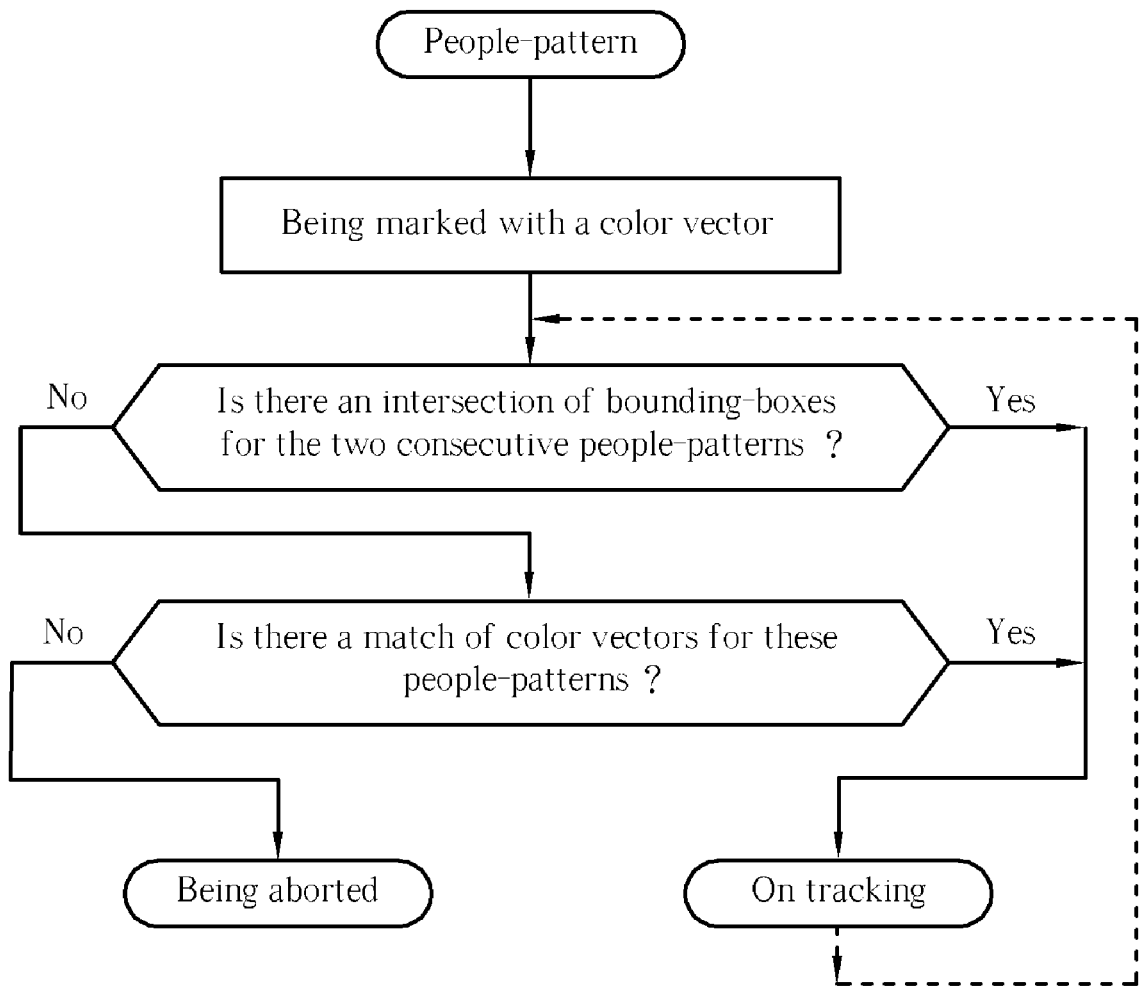
FIG. 8 is a flowchart illustrating the tracking procedure of the present invention.

In respect of tracking, the intersection check of the bounding-box pair for person-identification will last throughout the whole tracking process but the color vector of each people-pattern is sometimes calculated. The color vector is adopted for person-identification only when there is no intersection of the two bounding-boxes located in two successive frames. This can reduce a large amount of calculations required for color vectors. The above discussions about the tracking procedure can be described in FIG. 8. If there is an intersection of bounding-boxes or a match of color vectors for the two consecutive people-patterns segmented, it claims that the people-pattern is caught and such a tracking procedure will be continued for the people-pattern. If the person walks fast, detection of the intersection may be difficult but the system can still capture the person's image pattern. In such a situation, the color-vector matching procedure will be employed. On the other hand, if someone ceases moving or turns back, the people-pattern can be still detected by the bounding-box intersection and then the tracking will go on.

Figure 9:
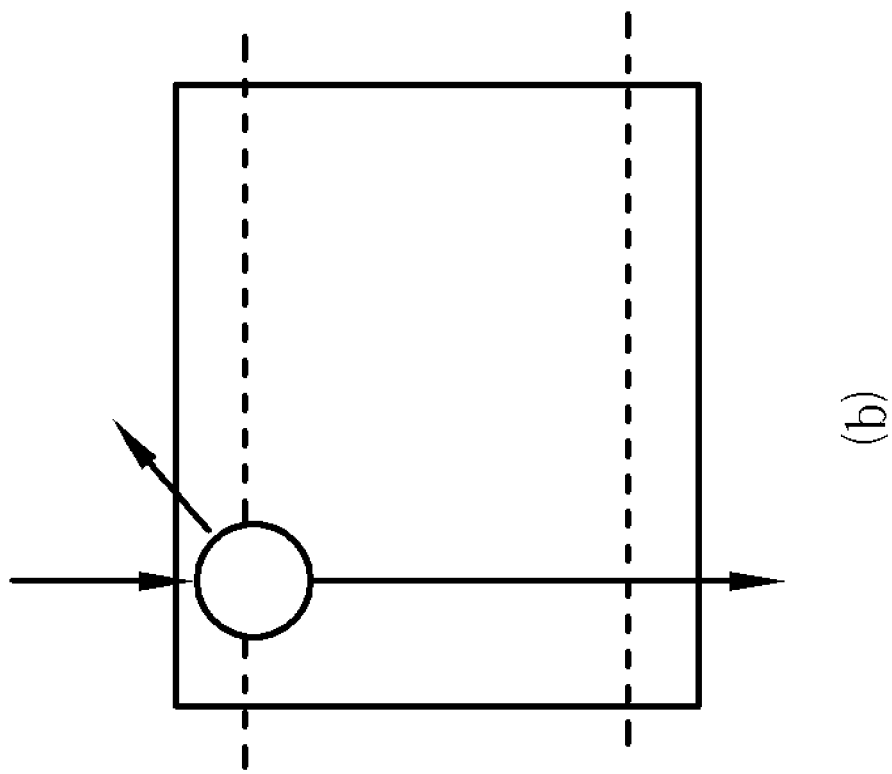
FIG. 9 is a diagram illustrating the situations resulted from fast moving.
Figure 9:
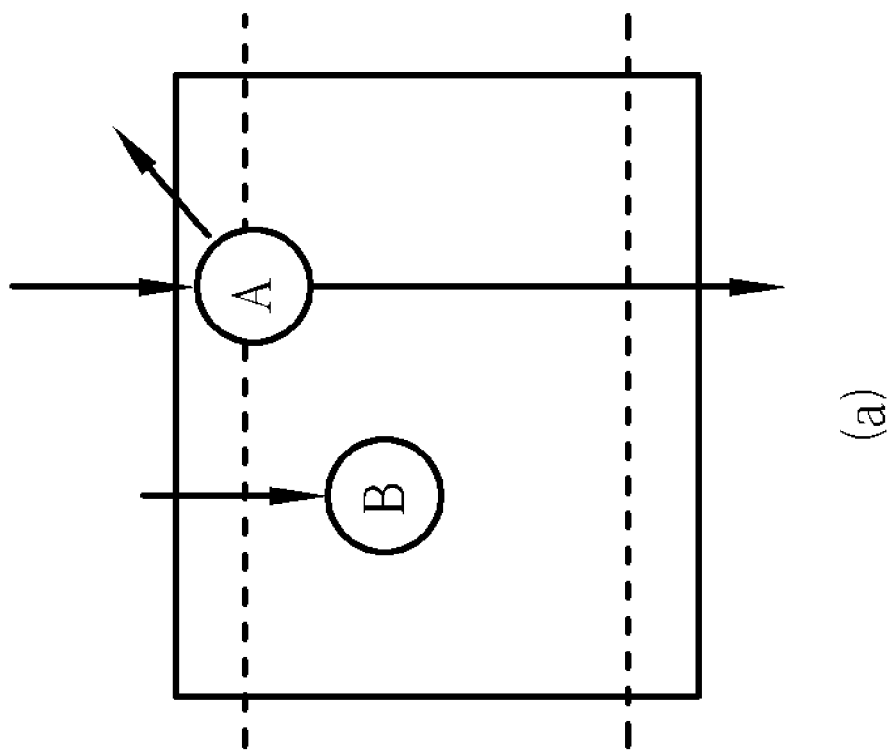

However, if there is no intersection of bounding-boxes and no match of color vector, it means that someone may move so fast as to result in two possible situations: (1) the person appearing in the current image frame is different from that of the next frame; (2) the person is present in the current image frame but absent in the next frame, as shown in FIG. 9. In the first situation (FIG. 9(a)), someone (person A in the figure) walks so rapid as to only appear in the current frame but not in the next frame (i.e., leaves the surveillance area) and another one (person B in the figure) suddenly appears only in the next frame. The second situation (FIG. 9(b)) will result from one quick pedestrian being present in the current frame and then the person goes rapidly away from the surveillance area before being captured in the next frame. In the above two situations, the major reason of disappearing for someone in the next frame may be that the person either turns back or goes through the gate very fast. Because it is intractable to judge that the people-pattern is forward or backward, the counting in such two situations should be aborted unless the frame-sampling rate can be increased so high as to be able to capture the pedestrian's image.

Figure 10:
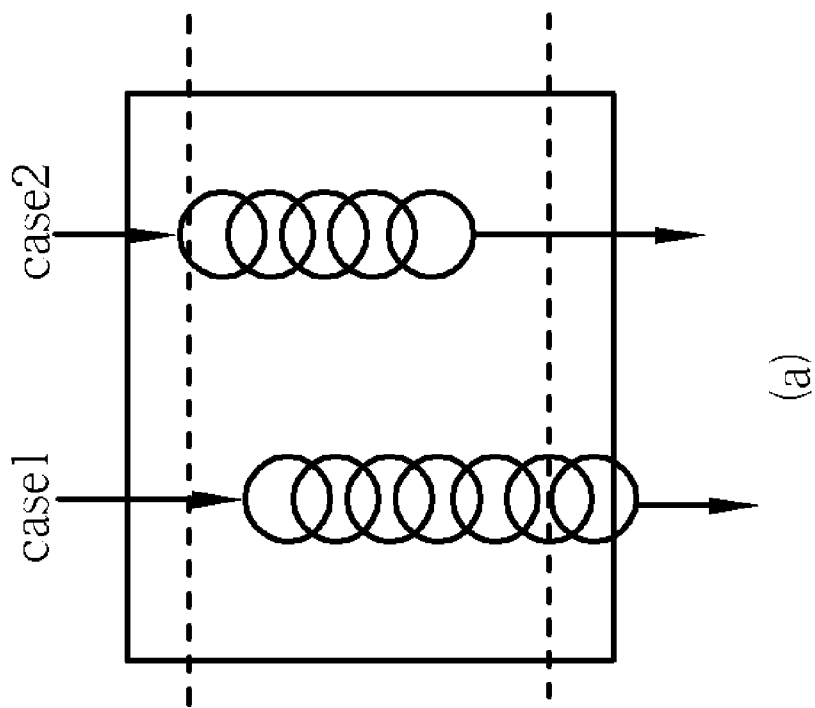
FIG. 10 is a diagram illustrating the situations resulted from abrupt moving.
Figure 10:
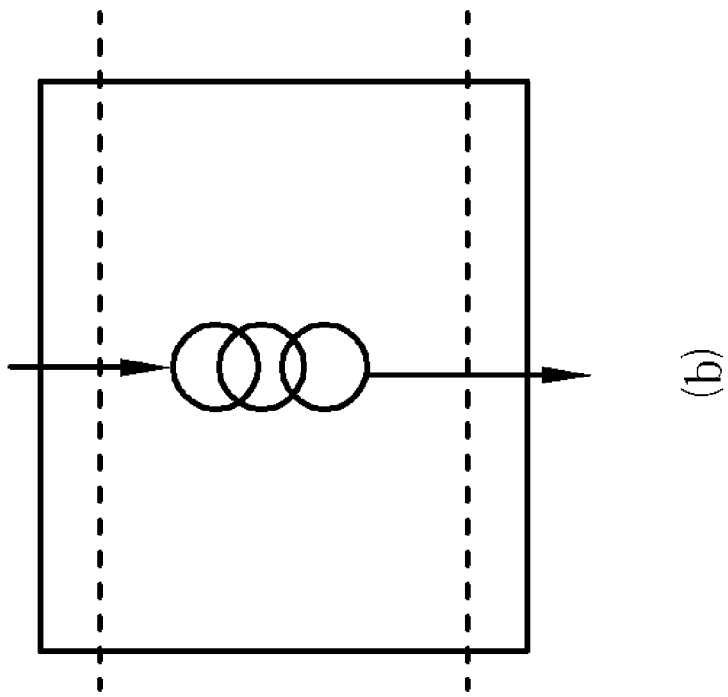

Generally speaking, the tracking procedure starts only when the people-pattern captured touches the base-line. Although, someone may move so abruptly that his or her image pattern touching one base-line has not been captured but has been captured on another base-line, as shown in FIG. 10(a). For case 1 of abrupt moving situations, the tracking procedure will be still executed and the person is counted when he touches the other base-line and then goes away. But for case 2 and the case of FIG. 10(b), it is difficult to determine when the moving pattern has moved out of the surveillance area, so the tracking will be aborted. In practice, such a case that people have not touched the base-line (FIG. 10(b)) is very rare to occur. Besides, some situations with the intentional disturbance to the tracking procedure will be not considered in this research.

It can be observed that the counting direction can be oriented by the order of moving across two base-lines or the base-line from which the people go away during the tracking process. This direction-orienting strategy requires the least computational cost, unlike many previous systems needing additional operations.

6. MERGE-SPLIT PROCESSING

Figure 11:
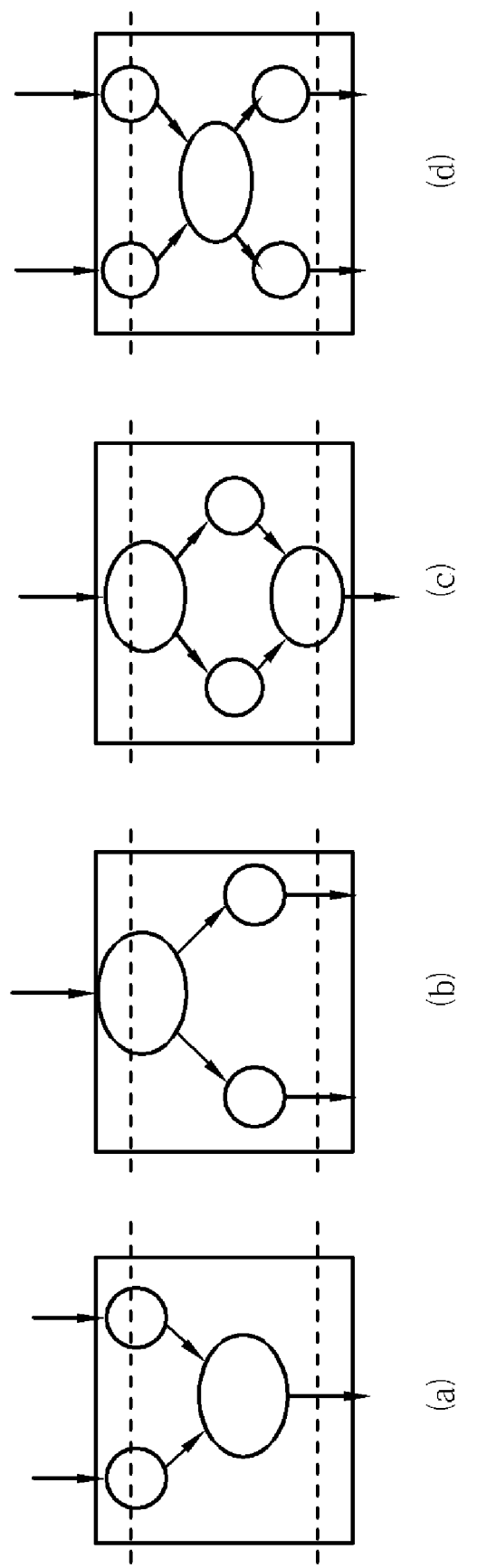
FIG. 11 is a diagram illustrating cases of merge-split.

In general, people may walk alone or together with their friends and this will result in one single-people pattern, several single-people patterns, one multi-people pattern, several multi-people patterns, or their mixed patterns in a surveillance area captured. For reasons mentioned previously, each moving object may happen to be split or merged within a range of the captured surveillance area and this merge-split problem may confuse the counting. Basically, the merge-split phenomenon can be classified into four cases, as shown in FIG. 11. A 2-to-1 merging case of FIG. 11(a) means that two moving patterns are merged into a single moving pattern, where each moving pattern may be composed of one or more persons. By the same deduction, 1-to-2 splitting case of FIG. 11(b), 1-to-2-to-1 split-merge case of FIG. 11(c), and 2-to-1-to-2 merge-split case of FIG. 11(d) mean that one moving pattern is split into two partial ones, one moving pattern is firstly split into two partial ones and finally merged into a large one, and two small moving patterns are firstly merged into a large one and finally split into two small ones, respectively.

Figure 12:
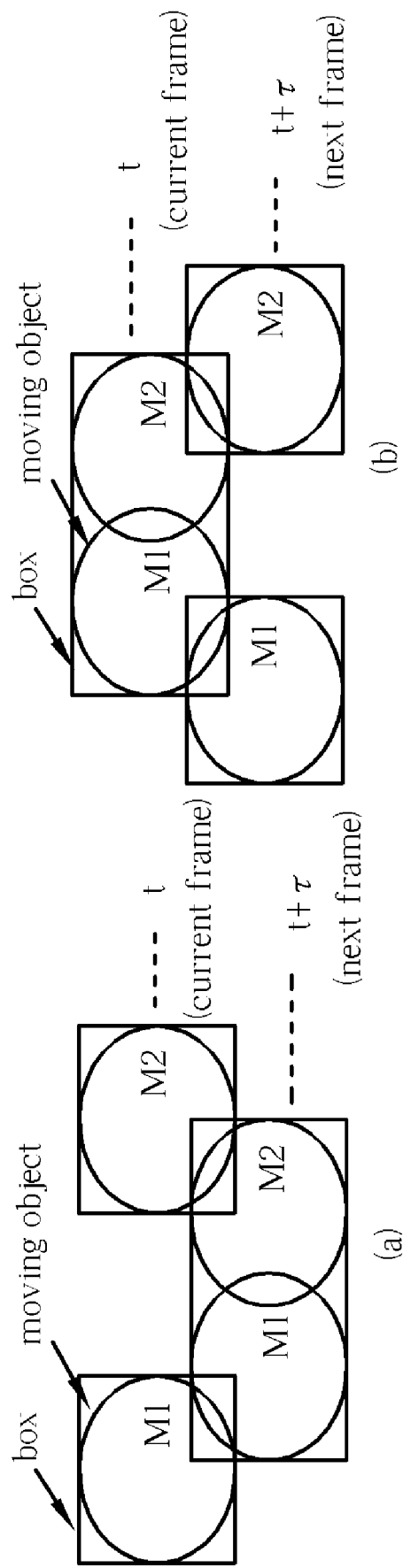
FIG. 12 is a diagram illustrating the judgement of merging and splitting cases.

From the above analysis for merge-split, to check if there is a merging or splitting case happening, the area change of the moving pattern can give a fundamental judgment, as shown in FIG. 12. In FIG. 12(a), a merging will be detected if two separate moving patterns move in the current frame (i.e., the frame of time t) and then are combined into a larger-area pattern in the next frame (i.e., the frame of time t+τ). Then, the people number of the new merged pattern needs to be calculated according to those area-based decision rules mentioned above in order to refine the initial count. Besides, the color vector also requires to be calculated for labeling the new moving object in the following tracking. Based on the opposite reasoning, a judgment of splitting case can be illustrated from FIG. 12(b). If there is no intersection between two successive bounding-boxes, as revealed in FIG. 7(b), for both merging and splitting cases, each moving object, can be also identified by use of color vector for the tracking purpose. But if both conditions of no intersection and no match of color vectors are met, it is difficult to distinguish the new generated patterns from their neighboring patterns, i.e., recognition of the patterns which form the new patterns is difficult. However, the count may be still correct if the track was ever lost temporarily because this case is similar to case 1 of FIG. 10(a).

Figure 13:
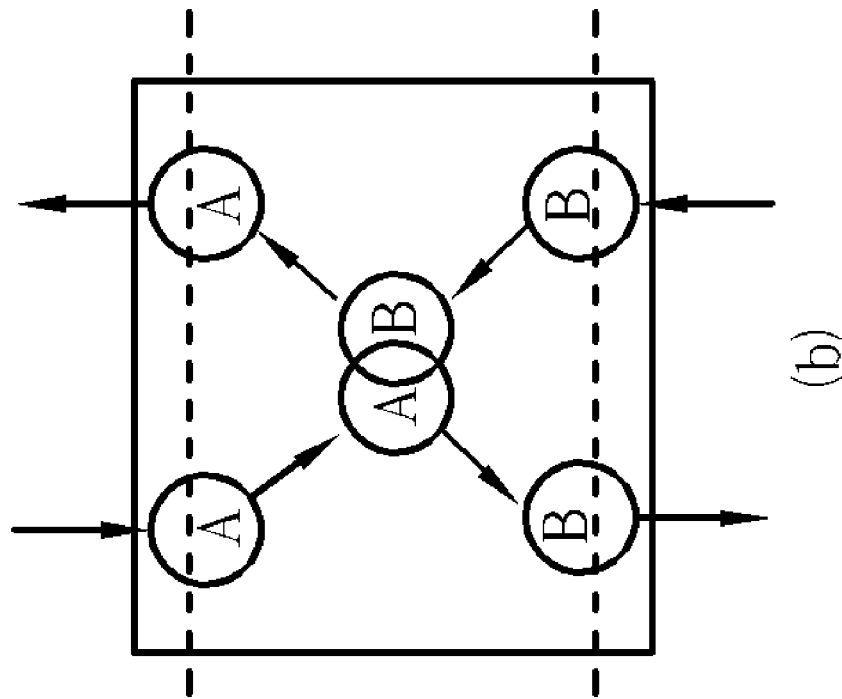
FIG. 13 is a diagram illustrating inverse-direction touching situation.
Figure 13:
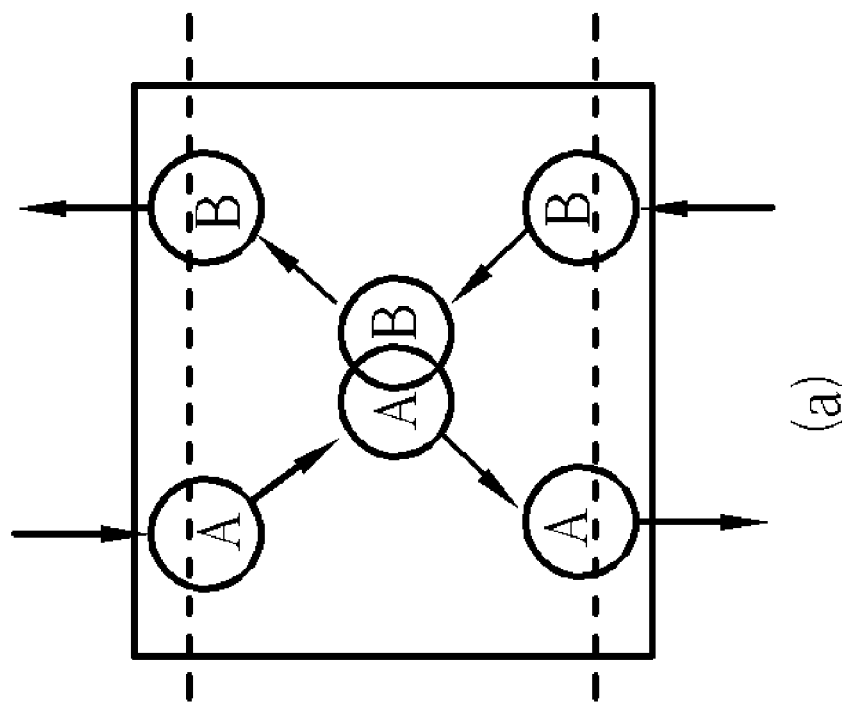

When two moving patterns move in a mutually opposite direction and then touch with each other in the middle of way or so, this will result in the normal case and abnormal case, as shown in FIG. 13. If there is the similarity of color but no intersection of successive bounding-boxes for both moving patterns, the track of each moving object will be confused. In the normal case (FIG. 13(a)), the count is still correct in spite of a loss of track. But, it will make on erroneous count in the abnormal case (FIG. 13(b)). Furthermore, the above cases may be mixed with one another to produce other hybrid cases of merge-split, in which some cases are intractable to handle. It should be pointed out that the situation of splitting and merging of more than two images can be done with the single image described above.

7. COUNTING ALGORITHM

Figure 2:
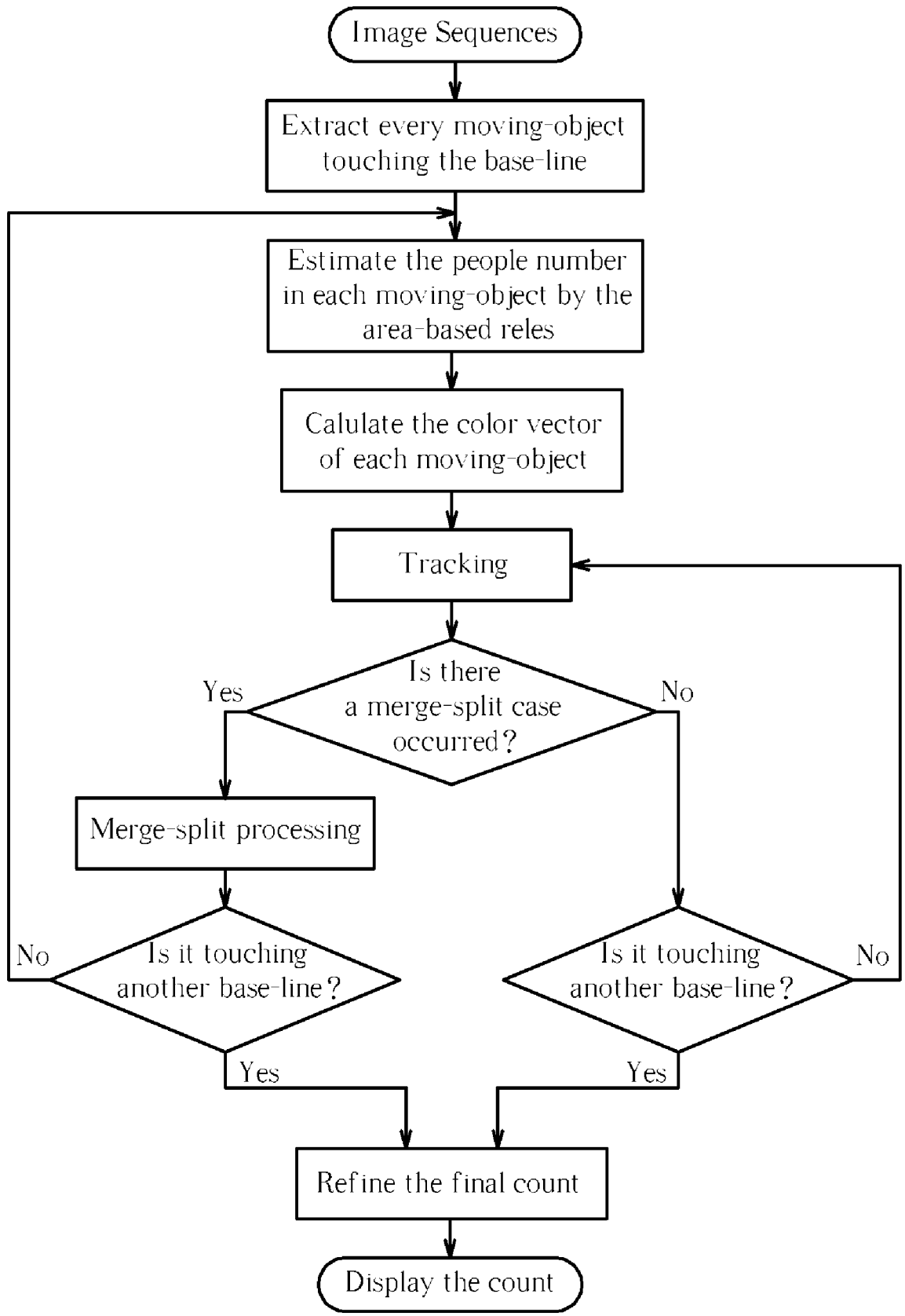
FIG. 2 is a flowchart illustrating the algorithm of the present invention.
Figure 3:
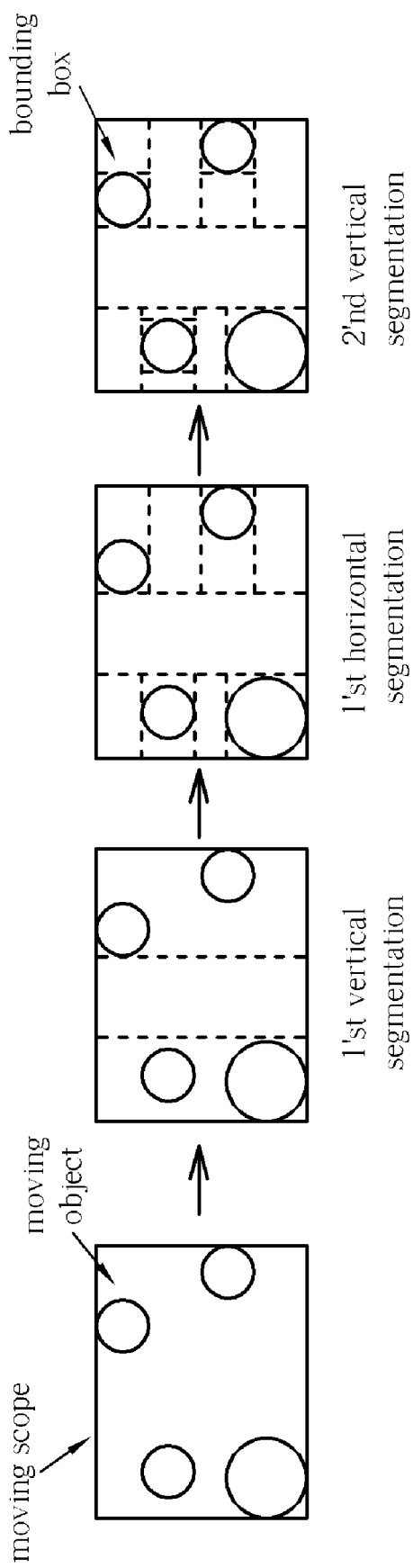
FIG. 3 is a diagram illustrating a simple multi-object segmentation algorithm.

To achieve an automatic bi-directional counting for the pedestrian passing through a gate (or door), the proposed algorithm is described in FIG. 2. Based on the motion analysis, the binary image is helpful for deriving a static background from an image captured. Background extraction is important because a static background is required for the motion-based method to generate the reference frame. Then, the captured image sequences are transformed into a bi-level format for each image frame by image differencing. Thus, the pedestrian can be distinguished from the background by segmenting the pedestrian pattern from an image. When segmenting the moving region, the largest moving scope is firstly obtained and then each moving object, i.e., people-image, within the scope can be extracted, with a simple multi-object segmentation algorithm, as illustrated in FIG. 3. If there is a higher flow-rate of pedestrians, one view captured by the camera may contain several people-images, where each people-image may consist of one or more persons.

After obscuring each moving object, the quantity of people existing in a moving object is firstly estimated through an area-based strategy followed by a chromatic analysis to track the first count. In the tracking process, the merge-split case may be encountered, where the merge-split phenomenon means that one people-image is split into multiple people-images and/or multiple people-images are merged into one. Based on the HSI histogram analysis, the distinguishing vector, also called "color vector", is extracted for recognizing each moving object against the merge-split problem. It should be pointed out that in practice, the merge-split problem usually happens because the pedestrian's body may touch with one another when walking and thus it will incur a merging case in an image captured. Also, a splitting case will appear when someone is leaving from a moving multi-people group.

Figure 14:
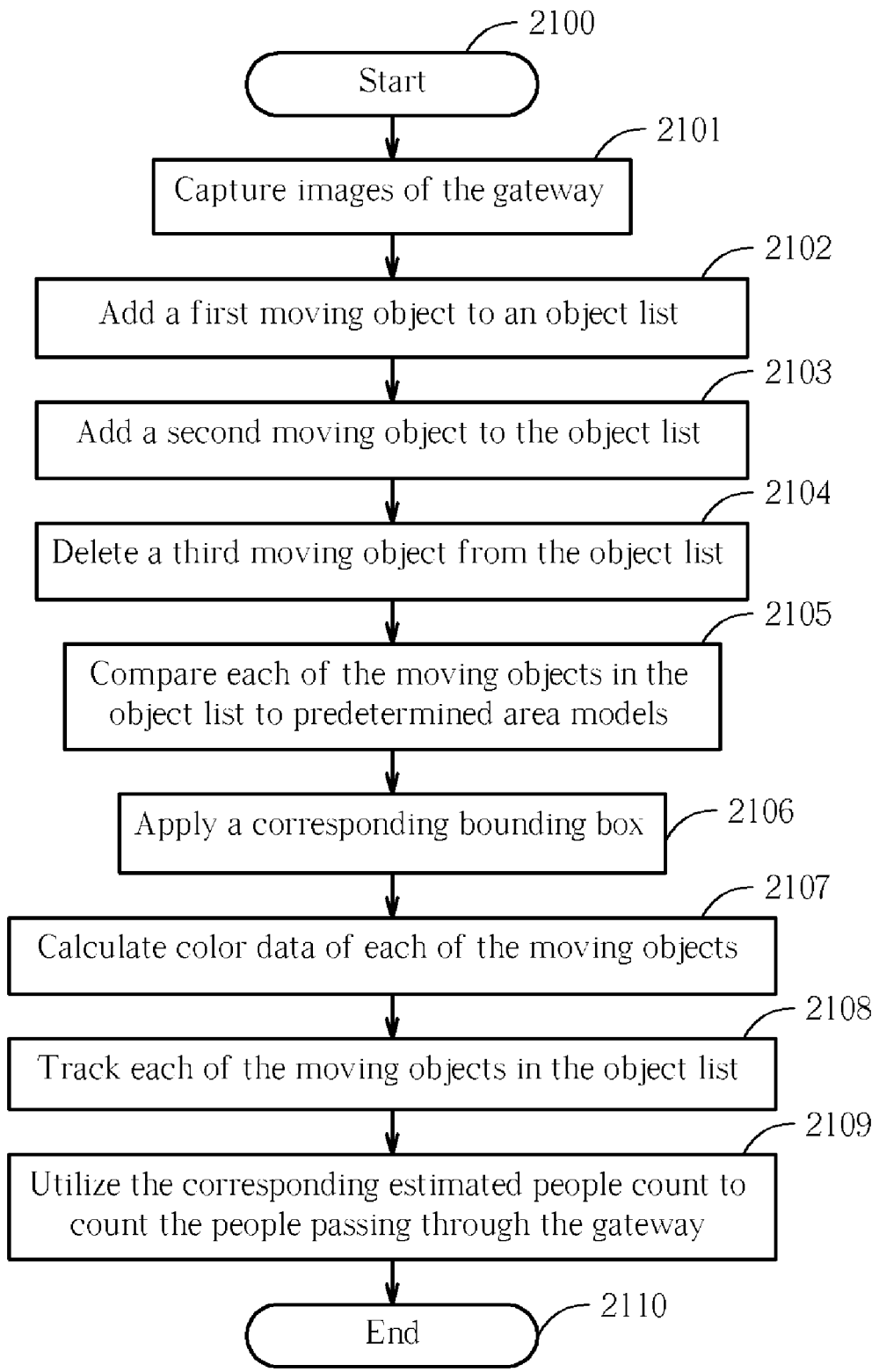
FIG. 14 is a flowchart illustrating the method for counting people through a gate of the present invention.

FIG. 14 is a flowchart illustrating the steps of the method for counting people passing through a gate of the present invention. The steps are described as follows:

Step 2100: Start;

Step 2101: Capture substantially vertically downward images of the gateway;

Step 2102: Add a first moving object to an object list when the first moving object crosses a first baseline according to a first image of the captured images;

Step 2103: Add a second moving object to the object list when a image of the captured images subsequent to the first image indicates that the second moving object split from another moving object already in the object list;

Step 2104: Delete a third moving object from the object list when a image of the captured images subsequent to the first image indicates that the third moving object merged with another moving object already in the object list;

Step 2105: Compare each of the moving objects in the object list to predetermined area models for an estimated people count corresponding to each of the moving objects;

Step 2106: Apply a corresponding bounding box onto each of the moving objects in the object list;

Step 2107: Calculate color data of each of the moving objects in the object list for generating a corresponding color vector according to a predetermined algorithm;

Step 2108: Track each of the moving objects in the object list according to the corresponding color vector and the corresponding bounding box;

Step 2109: Utilize the corresponding estimated people count to count the people passing through the gateway when the corresponding moving object is tracked as crossing a second base line;

Step 2110: End.

8. CONCLUSIONS

The present invention provides an automatic bi-directional people-counting method dedicated to passing through a gate or door. An area-based estimation is adopted for deriving an early count of pedestrians. Then, the color information of the pedestrian's clothing or wear is used to label each person followed by a bounding-box intersection based procedure to track the people. Hence, two important and inherent situations, a crowded situation of several passing people touching together and the general merge-split phenomenon can be overcome. Besides, the accuracy of the proposed counting algorithm in the case of fast moving can be further improved by increasing the processing frame-rate. Hence, the present invention can provide a cost-effective people-counting technique and thus it will be more attractive than other methods for counting passing-people through a gate or door.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for counting people passing through a gateway, the method comprising:

capturing substantially vertically downward images of the gateway with a camera;

adding a first moving object to an object list when the first moving object crosses a first baseline according to a first image of the captured images;

adding a second moving object to the object list when an image of the captured images subsequent to the first image indicates that the second moving object split from another moving object already in the object list;

deleting a third moving object from the object list when an image of the captured images subsequent to the first image indicates that the third moving object merged with another moving object already in the object list;

comparing each of the moving objects in the object list to predetermined area models for an estimated people count corresponding to each of the moving objects;

applying a corresponding bounding box onto each of the moving objects in the object list;

calculating color data of each of the moving objects in the object list for generating a corresponding color vector according to a predetermined algorithm;

tracking each of the moving objects in the object list according to the corresponding color vector and the corresponding bounding box; and updating the estimated people count to count the people passing through the gateway when the corresponding moving object is tracked as crossing a second base line.

* * * * *